United States Patent [19]
Robbins, Jr.

[11] 3,805,824
[45] Apr. 23, 1974

[54] PRESSURE-COMPENSATED FLOW CONTROL VALVE

[75] Inventor: Roland W. Robbins, Jr., China Lake, Calif.

[73] Assignee: The United States of America as represented by the Secretary of the Navy, Washington, D.C.

[22] Filed: Sept. 25, 1972

[21] Appl. No.: 292,060

[52] U.S. Cl. ............................................. 137/504
[51] Int. Cl. .. F16k 31/163, F16k 31/36, F16k 3/26
[58] Field of Search ........ 137/504, 505.25; 251/333

[56] References Cited
UNITED STATES PATENTS

| | | | |
|---|---|---|---|
| 3,710,820 | 1/1973 | Simpson, Jr. | 137/504 |
| 2,541,464 | 2/1951 | Davies | 137/504 X |
| 2,777,458 | 1/1957 | Stern | 137/504 X |
| 3,170,481 | 2/1965 | Presnell | 137/504 X |
| 3,130,747 | 4/1964 | Benaway | 137/504 |
| 3,196,902 | 7/1965 | Richmond | 137/504 |
| 3,472,275 | 10/1969 | Castro et al. | 137/504 X |
| 3,496,962 | 2/1970 | Tuzson | 137/504 |

Primary Examiner—Henry T. Klinksiek
Assistant Examiner—Robert J. Miller
Attorney, Agent, or Firm—R. S. Sciascia; Q. E. Hodges

[57] ABSTRACT

The invention is a pressure-compensated flow control valve for metering liquid from a high pressure to a low pressure at a controlled and constant rate of flow.

4 Claims, 1 Drawing Figure

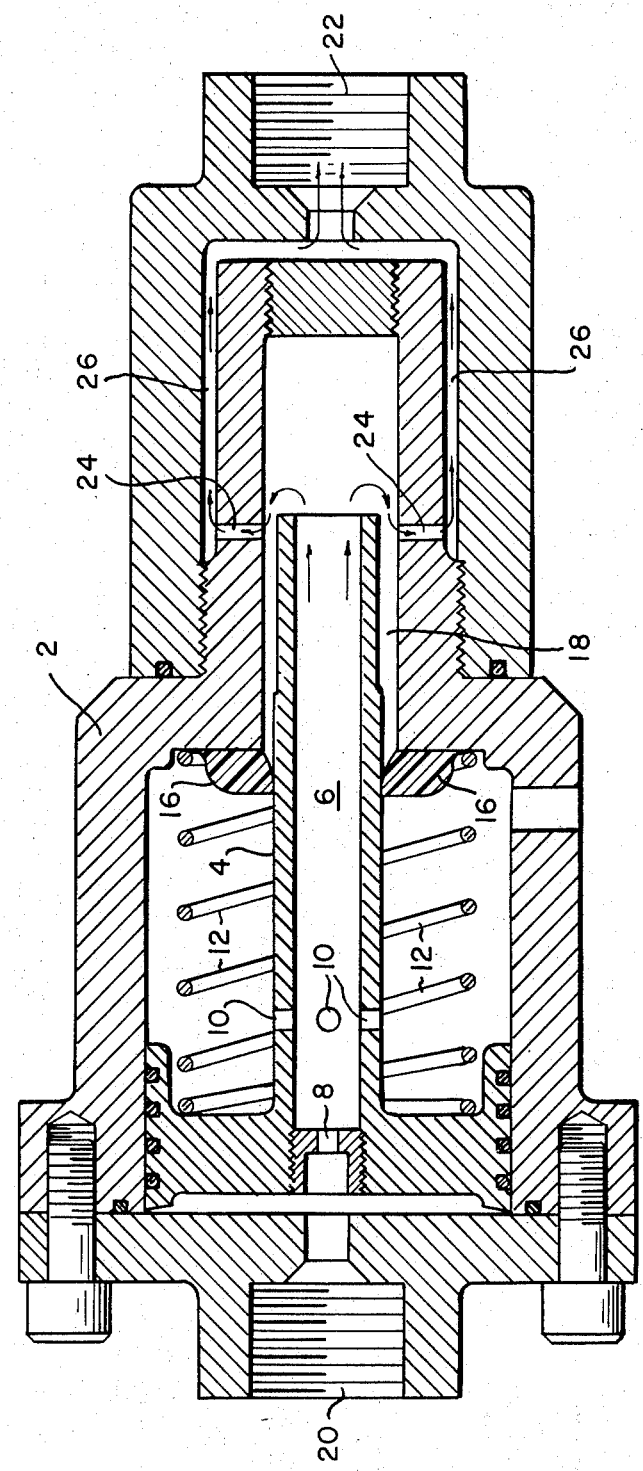

PRESSURE-COMPENSATED FLOW CONTROL VALVE

The invention described herein may be manufactured and used by or for the Government of the United States of America for Governmental purposes without the payment of any royalties thereon or therefor.

BACKGROUND OF THE INVENTION

Presently known pressure compensated metering valves were designed to handle clean hydraulic fluid only. The present invention provides a means for metering contaminated seawater or any corrosive contaminated liquid.

SUMMARY OF THE INVENTION

The general purpose of the invention is to provide a means for metering liquid from a high pressure to a low pressure at a controlled and constant rate of flow. To attain this desired result, the present invention provides a pressure compensated flow control valve consisting of a cylindrical body section containing a stepped bore within which is located a sliding piston which reciprocates corresponding to changes in pressures and provides throttling in accordance therewith.

OBJECTS OF THE INVENTION

It is a principle object of the instant invention to provide a valve for metering liquid from a high pressure to a low pressure at a controlled and constant rate of flow;

It is a further object of the instant invention to provide a flow control valve which can be used for metering contaminated seawater or corrosive contaminated liquid.

BRIEF DESCRIPTION OF THE DRAWING

The FIGURE shows a full section view of the pressure compensated flow control valve.

DESCRIPTION OF THE PREFERRED EMBODIMENT

With continued reference to the drawing, the FIGURE shows the pressure compensated flow control valve consisting of a cylindrical body section 2 containing a stepped bore within which is located a sliding piston 4. The sliding piston 4 contains a bore 6 extending through its entire length. A reduced diameter orifice 8 is located at the one end of this bore. Slightly downstream from orifice 8 a series of radial holes 10 are located to provide a fluid (and hence a pressure) passage between the bore 6 and the volume under the large diameter of the piston 4. The large diameter piston is free to slide within the stepped bore, however, a fluid seal is effected between it and the bore. Located under the large diameter piston is a spring 12 which continually forces the piston 4 up toward the top of the valve.

The small diameter of the sliding piston 4 is engaged by an elastomeric seal 16 toward its upper end to prevent fluid flow along its outer diameter. The lower end of the small diameter piston has a predetermined annular clearance between it and the valve body. This clearance is the throttling annulus 18 and during operation essentially all of the pressure drop occurs along this annulus. As will be shown, the length of the annulus 18 is variable and is determined by the magnitude of the pressure differential across the inlet and discharge ports 20 and 22, respectively. When the sliding piston 4 is in its uppermost position, the bottom edge of the small diameter portion is approximately even with two radial ports 24 which admit fluid flow into the outer flow annulus 26. The outer flow annulus 26 serves to direct the fluid to the discharge port 22 and does not act as a constriction. In operation the fluid enters the inlet port 20, passes through the orifice 8 in the top of the sliding piston 4 and then on down the center bore 6 and out the end. The fluid then gets forced up through the throttling annulus 18 and out the radial ports 24. From there it goes through the flow annulus 26 and on out the discharge port 22.

As the fluid passes through the orifice 8 a pressure drop occurs. The low pressure on the downstream side is communicated to the bottomside of the large diameter piston. A net downward force is thus felt by the piston 4 driving it down into the bore until the force is balanced out by the spring 12. If the pressure differential across the valve inlet port 20 and discharge port 22 is increased the immediate result is to try to force a higher rate of flow through the valve. As soon as the flow rate starts to increase a greater pressure drop is generated across the orifice 8 thus driving the piston 4 further into the bore. The downward motion of the piston creates a longer throttling annulus 18 thus further restricting the flow. The net result is a slight increase in flow rate. A slight discontinuity occurs at the very low-pressure where the two radial flow channels 24 become essentially completely uncovered and the throttling annulus 18 is no longer in operation. This is done purposely so that the valve can be fully operational from only a few psi up to 9,000 psi or greater if necessary.

The valve shown can be used over a wide range of flow rates and pressure differentials. To change the nominal flow rate capability of the valve it is necessary to change the spring and the orifice size and adjust the throttling annulus clearance.

In the preferred embodiment the bore is lined with a ceramic liner and a plasma-sprayed piston is used.

It is understood that the invention is not limited to exact details of construction shown and described for obvious modifications will occur to persons skilled in the art. It is therefore to be understood that within the scope of the appended claims the invention may be practiced otherwise than as specifically described.

What is claimed is:

1. A flow control valve comprising a hollow valve body having an inlet and an outlet port;
   means for passing the flow through said valve body;

means within said body responsive to changes in the pressure differential between the inlet and outlet ports for metering the flow through the valve;
   said means for passing the flow including a spring biased piston having a bore there through for the passage of the fluid flow and being slidable within said body to form with said body an annular throttling passage of variable length, whereby the fluid flow is maintained constant; a variable length throttling annulus;
   the hollow portion of said valve body is a stepped bore;
   said piston sliding within said stepped bore;
   said stepped bore includes a larger chamber and a small chamber; and
   a seal mounted to separate the chambers.

2. The valve of claim 1, wherein:
said piston slidably passes through said seal; and
said throttling annulus being formed between said piston and the body within said small chamber.

3. The valve of claim 2, wherein:
means for passing the flow includes within said small chamber a plurality of radial ports positioned within the area of said throttling annulus for connecting said throttling annulus with said outlet port.

4. A flow control valve comprising:
a housing;
a first hollow volume within said housing;
a second hollow volume within said housing;
a piston comprising a head within said first hollow volume and a hollow shaft portion extending from said head to said second hollow volume, said shaft and said second hollow volume forming a variable length throttling annulus which varies with the displacement of said piston; a variable length throttling annulus; and,
a sealing means fixed to said housing and slidably engaging said shaft.

* * * * *